(12) United States Patent
Carraro et al.

(10) Patent No.: US 11,750,284 B2
(45) Date of Patent: Sep. 5, 2023

(54) OPTICAL WIRELESS COMMUNICATION SYSTEM AND METHOD

(71) Applicant: pureLiFi Limited, Edinburgh (GB)

(72) Inventors: Luca Carraro, Edinburgh (GB); Istvan Philipe Bernard Csajaghy, Edinburgh (GB); Christopher Nigel Tate, Edinburgh (GB); Duncan John William Walker, Edinburgh (GB)

(73) Assignee: PURELIFI LIMITED, Edinburgh (GB)

( * ) Notice: Subject to any disclaimer, the term of this patent is extended or adjusted under 35 U.S.C. 154(b) by 154 days.

(21) Appl. No.: 17/441,106

(22) PCT Filed: Mar. 19, 2020

(86) PCT No.: PCT/GB2020/050738
§ 371 (c)(1),
(2) Date: Sep. 20, 2021

(87) PCT Pub. No.: WO2020/188290
PCT Pub. Date: Sep. 24, 2020

(65) Prior Publication Data
US 2022/0166506 A1 May 26, 2022

(30) Foreign Application Priority Data
Mar. 21, 2019 (GB) .................................. 1903867

(51) Int. Cl.
*H04B 10/116* (2013.01)
*H05B 47/19* (2020.01)
*H04B 10/114* (2013.01)

(52) U.S. Cl.
CPC ....... *H04B 10/116* (2013.01); *H04B 10/1143* (2013.01); *H04B 10/1149* (2013.01); *H05B 47/19* (2020.01)

(58) Field of Classification Search
CPC .............. H04B 10/116; H04B 10/1143; H04B 10/1149; H05B 47/19
(Continued)

(56) References Cited

U.S. PATENT DOCUMENTS 5,995,253 A * 11/1999 Flaherty ............. H04B 10/1149
398/118
2008/0170863 A1* 7/2008 Won ..................... H04B 10/116
398/172
(Continued)

FOREIGN PATENT DOCUMENTS

WO 2019002884 A1 1/2019

OTHER PUBLICATIONS

Written Opinion issued in PCT/GB2020/050738 dated Nov. 27, 2020.
(Continued)

*Primary Examiner* — Dalzid E Singh
(74) *Attorney, Agent, or Firm* — SNELL & WILMER L.L.P.

(57) ABSTRACT

An optical wireless communication (OWC) device comprises: a receiver comprising: a dual-wavelength filter configured to filter light arriving at the receiver, wherein the dual-wavelength filter is configured to pass light of a first frequency and light of a second, different frequency, and wherein the dual-wavelength filter is configured to substantially block light of a third frequency between the first frequency and second frequency; and a photodetector configured to receive the filtered light and to sense modulated light of the first frequency and/or modulated light of the second frequency to produce at least one receiver signal; demodulation circuitry and a processing resource for performing a demodulation and processing with respect to the at least one receiver signal to obtain data encoded in the
(Continued)

modulated light of the first frequency and/or data encoded in the modulated light of the second frequency; a transmitter comprising a light source configured to output modulated light of the third frequency; a further transmitter comprising a further light source configured to output modulated light of the second frequency; and a controller configured to control operation of the transmitter and/or further transmitter to produce an output OWC signal in which data is encoded by modulation of light emitted by the light source and/or further light source.

22 Claims, 6 Drawing Sheets

(58) Field of Classification Search
USPC .......................................................... 398/118
See application file for complete search history.

(56) References Cited

U.S. PATENT DOCUMENTS

| | | | |
|---|---|---|---|
| 2008/0212981 A1* | 9/2008 | Yamada | H04B 10/1141 398/202 |
| 2011/0200338 A1* | 8/2011 | Yokoi | H04B 10/116 398/158 |
| 2014/0255038 A1* | 9/2014 | Richards, IV | H04B 10/116 398/118 |
| 2017/0093488 A1 | 3/2017 | Wang et al. | |
| 2017/0373752 A1 | 12/2017 | Rains et al. | |
| 2019/0082520 A1* | 3/2019 | Noshad | H05B 47/19 |

OTHER PUBLICATIONS

Adiono et al., "Analog Filters Design in VLC Analog Front-End Receiver for Reducing Indoor Ambient Light Noise," 2016 IEEE Asia Pacific Conference on Circuits and Systems (APCCAS), Oct. 2016.

Ali et al., "Modeling Cellular Networks with Full Duplex D2D Communication: A Stochastic Geometry Approach," IEEE Transactions on Communications vol. 64 , Issue: 10, 4409-4424, Aug. 2016.

Aveta et al., "Multi-user FSO communication link," 2017 Cognitive Communications for Aerospace Applications Workshop (CCAA), Jun. 2017.

Elgala et al., "OFDM visible light wireless communication based on white LEDs," 2007 IEEE 65th Vehicular Technology Conference—VTC2007—Spring, Aug. 2007.

Fuada et al., "A First Approach to Design Mobility Function and Noise Filter in VLC System Utilizing Low-cost Analog Circuits," International Journal of Recent Contributions from Engineering, Science & IT (iJES), vol. 5 No. 2, Jul. 2017.

Gismalla et al., "Device to Device Communication for Internet of Things Ecosystem: An Overview," International Journal of Integrated Engineering vol. 9, No. 4, Dec. 2017.

Calibrated Photodiodes, Thorlabs.com, https://www.thorlabs.de/NewGroupPage9.cfm?objectgroup_id=2822.

Si Avalanche Photodetectors, Thorlabs.com, https://www.thorlabs.com/newgrouppage9.cfm?objectgroup_id=6686.

Graphene-CMOS High-Res Sensor Images Visible and IR Light at the Same Time, Tech Pulse, Aug. 2017, Photonics Spectra, Photonics.com, https://www.photonics.com/Articles/Graphene-CMOS_High-Res_Sensor_Images_Visible_and/a62111.

\* cited by examiner

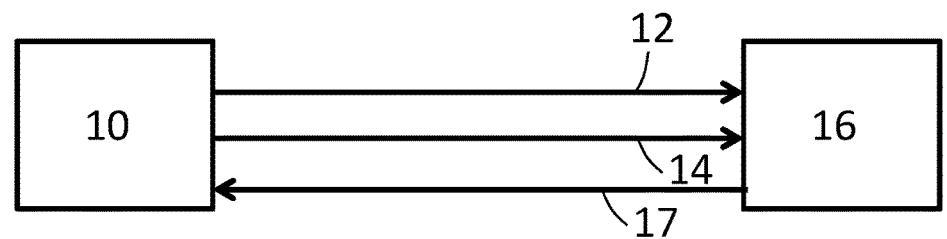
Figure 1
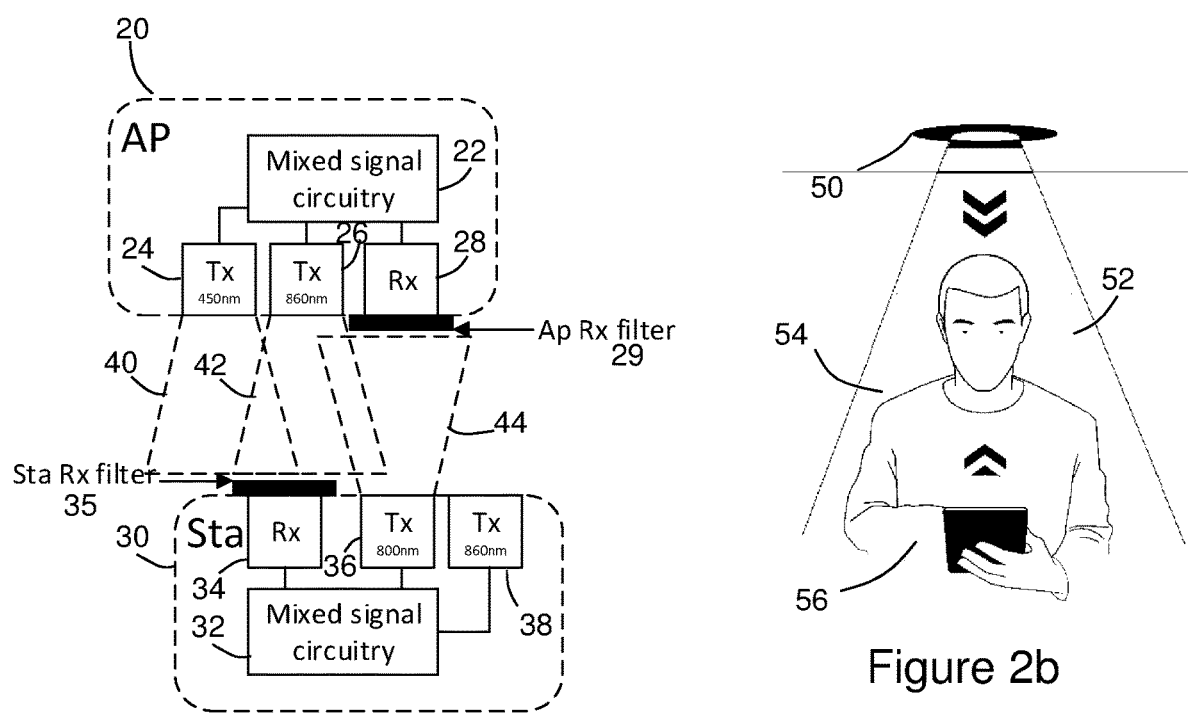
Figure 2a
Figure 2b

OPTICAL WIRELESS COMMUNICATION SYSTEM AND METHOD

CROSS-REFERENCE TO RELATED APPLICATIONS

This application is a national stage application of PCT/GB2020/050738, filed on Mar. 19, 2020, entitled "OPTICAL WIRELESS COMMUNICATION SYSTEM AND METHOD," which claims priority to UK Application No. 1903867.8, filed on Mar. 21, 2019, both of which are hereby incorporated by reference in their entirety for all purposes.

FIELD

The present invention relates to an optical wireless communication system and method.

BACKGROUND

It is known to provide wireless data communications by using light instead of radio frequencies to transmit and receive data wirelessly between devices. Data may be transmitted using light by modulating an intensity of the light. The light used may be coherent or incoherent. Methods that use light to transmit data wirelessly may be referred to as optical wireless communications (OWC) or light communications (LC).

Optical wireless communication (OWC), or light communication (LC), can offer advantages over conventional RF wireless communication such as Wi-Fi™, due to characteristics of the optical channel. Optical signals usually do not penetrate, for example, walls, unlike RF signals, which can provide for increased security. Furthermore, the optical transmissions can be particularly directional in nature.

Wireless networks using visible light may in some circumstances allow a higher data capacity and greater energy efficiency than radio frequency wireless networks, and may also be used to replace point-to-point infrastructure in locations where conventional infrastructure does not exist or is too expensive to build.

A typical OWC system is a LiFi system which may comprise one or more Access Points (APs) and one or more Stations (STAs). In one such LiFi system, an AP communicates with a STA via a downlink from AP to STA and an uplink from STA to AP. Full-duplex communication is achieved by the uplink and downlink wireless communication being performed at different wavelengths or different ranges of wavelengths. For example, the AP may be incorporated into a luminaire and may use the visible light of the luminaire for the downlink. The STA may be incorporated into a mobile device, for example a smartphone, and may use infrared (IR) for the uplink. In this system, APs do not communicate with each other. STAs do not communicate with each other.

To optimise signal to noise ratio (SNR) at the receiver, an optical filter may be used in conjunction with one or more photodetectors to optically separate light at a desired wavelength from light in the rest of the received spectrum. Light outside of the chosen wavelength or range of wavelengths may contribute to noise if not filtered out. Therefore, two stations emitting at the same wavelength are generally not sensitive to each other's light when communicating via LiFi.

SUMMARY

In a first aspect, there is provided an optical wireless communication (OWC) device comprising: a receiver comprising: a dual-wavelength filter configured to filter light arriving at the receiver, wherein the dual-wavelength filter is configured to pass light of a first frequency and light of a second, different frequency, and wherein the dual-wavelength filter is configured to substantially block light of a third frequency between the first frequency and second frequency; and a photodetector configured to receive the filtered light and to sense modulated light of the first frequency and/or modulated light of the second frequency to produce at least one receiver signal; demodulation circuitry and a processing resource for performing a demodulation and processing with respect to the at least one receiver signal to obtain data encoded in the modulated light of the first frequency and/or data encoded in the modulated light of the second frequency. The OWC device may further comprise a transmitter comprising a light source configured to output modulated light of the third frequency and a further transmitter comprising a further light source configured to output modulated light of the second frequency. The OWC device may further comprise a controller configured to control operation of the transmitter and/or further transmitter to produce an output OWC signal in which data is encoded by modulation of light emitted by the light source and/or further light source.

Thus, potential for interference in the at least one receiver signal arising from transmission by the transmitter at the third frequency may be eliminated or at least reduced.

The controller may be further configured to select a first mode of operation or second mode of operation for the OWC device. The first mode of operation may comprise receiving modulated light of the first frequency and/or second frequency and transmitting data by modulation of light of the third frequency emitted by the transmitter. The second mode of operation may comprise receiving modulated light of the second frequency and transmitting data by modulation of light of the second frequency emitted by the further transmitter.

The first mode of operation may comprise full-duplex communication with an optical wireless communication apparatus. The second mode of operation may comprise half-duplex optical wireless communication with at least one further OWC device.

The OWC device may comprise or form part of a station. The first mode of operation may comprise communication with an access point. The second mode of operation may comprise communication with one or more further stations.

The OWC device may comprise or form part of a mobile device.

The light of the first frequency may comprise visible light. The light of the second frequency may comprise infrared light. The light of the third frequency may comprise infrared light.

The light of the first frequency has a first wavelength. The first wavelength may be around 450 nm. The first wavelength may be 450 nm. The first wavelength may be between 430 nm and 470 nm, optionally between 440 nm and 460 nm, further optionally between 445 nm and 455 nm.

The light of the second frequency has a second wavelength. The second wavelength may be around 860 nm. The second wavelength may be 860 nm. The second wavelength may be between 840 nm and 880 nm, optionally between 850 nm and 870 nm, further optionally between 855 nm and 865 nm.

The light of the third frequency has a third wavelength. The third wavelength may be around 800 nm. The third wavelength may be 800 nm. The third wavelength may be between 780 nm and 820 nm, optionally between 790 m and 810 nm, further optionally between 795 nm and 805 nm.

The dual-wavelength filter may be configured to substantially block light from 500 nm to 700 nm. The dual-wavelength filter may be configured to substantially block light having wavelengths between a first filter wavelength and a second filter wavelength. The first filter wavelength may be greater than the wavelength for the light of the first frequency. The first filter wavelength may be greater than 450 nm, optionally greater than 460 nm, further optionally greater than 470 nm, further optionally greater than 480 nm, further optionally greater than 490 nm, further optionally greater than 500 nm.

The second filter wavelength may be less than the wavelength for the light of the second frequency. The second filter wavelength may be less than 860 nm, optionally less than 850 nm, further optionally less than 840 nm, further optionally less than 830 nm, further optionally less than 820 nm, further optionally less than 810 nm.

The dual-wavelength filter may comprise a thin film filter. The dual-wavelength filter may comprise a coat glass wafer. The dual-wavelength filter may be mounted onto a casing. The casing may be a casing of the receiver. The dual-wavelength filter may be mounted such as to provide an air to glass interface at a first surface of the dual-wavelength filter. The dual-wavelength filter may be mounted such as to provide an air to glass interface at a second surface of the dual-wavelength filter. The first and second surfaces may be front and back surfaces.

The thin film filter may comprise a series of layers of different refractive indices on a substrate.

A wavelength of a band edge of the dual-wavelength filter may differ for different angles of incidence. The band edge may be the first filter wavelength. The band edge may be the second filter wavelength.

The dual-wavelength filter may have a first band edge wavelength with respect to light that is incident on the dual-wavelength filter at a first angle of incidence. The dual-wavelength filter may have a second, different band edge wavelength with respect to light that is incident on the dual-wavelength filter at a second, different angle of incidence. The first angle of incidence may be 0°. The second angle of incidence may be 30°. A difference between the first band edge wavelength and the second band edge wavelength may be between 3% and 4% of the first band edge wavelength. A difference between the first band edge wavelength and the second band edge wavelength may be between 3% and 4% of the second band edge wavelength. A difference between the first band edge wavelength and the second band edge wavelength may be more than 1% of the first band edge wavelength and/or second band edge wavelength, optionally more than 2%, further optionally more than 3%, further optionally more than 4%. A difference between the first band edge wavelength and the second band edge wavelength may be less than 10% of the first band edge wavelength and/or second band edge wavelength, optionally less than 8%, further optionally less than 6%, further optionally less than 4%. The band edge wavelength may be 820 nm at an angle of incidence of 0°. The band edge wavelength may be 850 nm at an angle of incidence of 30°.

The dual-wavelength filter may comprise a plasmonic filter.

There may be provided a system comprising a first OWC device as claimed or described herein and a second OWC device as claimed or described herein. The controller of the first OWC device may be configured to select the second mode of operation for communication between the first device and the second device. The controller of the second OWC device may be configured to select the second mode of operation for communication between the first device and the second device. The communication between the first device and the second device may be half-duplex communication. The communication between the first device and the second device may comprise transmission of modulated light of the second frequency by the further transmitter of the first device. The communication between the first device and the second device may comprise transmission of modulated light of the second frequency by the further transmitter of the second device. The communication between the first device and the second device may comprise receiving of modulated light of the second frequency using the receiver of the first device. The communication between the first device and the second device may comprise receiving of modulated light of the second frequency using the receiver of the second device.

The first OWC device may comprise or form part of a first station. The second OWC device may comprise or form part of a second, different station.

The first OWC device may comprise or form part of a first mobile device. The second OWC device may comprise or form part of a second, different mobile device.

There may be provided a system comprising a first OWC device as claimed or described herein and an optical wireless communication apparatus comprising transmitters configured to transmit modulated light of the first and second frequencies, and a receiver configured to receive modulated light of the third frequency. A controller of the OWC device may configured to select a first mode of operation for communication between the OWC device and the OWC apparatus. The communication between the OWC device and the OWC apparatus may be full-duplex communication. The communication between the OWC device and the OWC apparatus may comprise uplink transmission of modulated light of the third frequency by the transmitter of the OWC device to the receiver of the OWC device. The communication between the OWC device and the OWC apparatus may comprise downlink transmission of modulated light of the first and/or second frequency from at least one transmitter of the OWC apparatus to the receiver of the OWC device.

The OWC device may comprise or form part of a station. The OWC apparatus may comprise or form part of an access point.

The OWC apparatus may comprise or form part of a luminaire. A transmitter of the OWC apparatus may be configured to emit light of the first frequency to provide illumination.

The OWC device may comprise or forms part of a mobile device.

The downlink transmission of modulated light from the transmitters of the OWC apparatus may comprise sending a first modulation signal using the first frequency and sending a second, different modulation signal using the second frequency.

The OWC apparatus may be configured to use the first frequency for lower-speed data transmission. The OWC apparatus may be configured to use the second frequency for higher-speed data transmission.

The OWC device may be configured to combine a signal received on the first frequency and a signal received on the second frequency.

There may be provided a system comprising a first OWC device as claimed or described herein; a second OWC device as claimed or described herein; and an OWC apparatus. The OWC apparatus may comprise transmitters configured to transmit modulated light of the first and second frequencies, and a receiver configured to receive modulated light of the third frequency. A controller of the first OWC device may be configured to select a first mode of operation or second mode of operation for the first OWC device. The first mode of operation may comprise receiving modulated light of the first frequency and/or second frequency from the OWC apparatus and transmitting data to the OWC apparatus by modulation of light of the third frequency emitted by the transmitter. The second mode of operation may comprise receiving modulated light of the second frequency from the second OWC device and transmitting data to the second OWC device by modulation of light of the second frequency emitted by the further transmitter.

The light source and/or the further light source may comprise at least one of a light-emitting diode (LED), a laser, for example a VCSEL (vertical-cavity surface-emitting laser), a VCSEL array, or a laser diode, or an LEP (light-emitting plasma).

The modulated light may be modulated at a modulation rate of at least 1 kHz, optionally at least 100 kHz, further optionally at least 1 MHz. The modulated light may be modulated at a modulation rate of less than 1 PHz, further optionally less than 1 THz, further optionally less than 100 GHz, further optionally less than 10 GHz.

The modulated light may be modulated with a modulation scheme comprising at least one of on-off keying (OOK), phase shift keying (PSK), M-ary pulse amplitude modulation (M-PAM), M-ary quadrature amplitude modulation (M-QAM) or orthogonal frequency division multiplexing (OFDM), Discrete Hartley transformation, Wavelet packet division multiplexing (WPDM), Hadamard coded modulation (HCM), pulse-position modulation (PPM), Colour shift keying (CSK), carrier-less amplitude and phase (CAP), discrete multi-tone (DMT). The modulation may be coherent or incoherent.

The or each OWC device may support a communication protocol comprising at least one of IEEE 802.15.7, 802.15.13, 802.11 or extensions or developments thereof; ITU-T G.9960 or extensions or developments thereof; or ITU-T G.vlc or extensions or developments thereof.

Light transmitted by the light source and/or further light source and/or light received by the photodetector may comprise visible light and/or non-visible light. For example, light may comprise visible light, infra-red light or ultraviolet light. Optionally, the light may comprise electromagnetic waves with wavelengths in a range 1 nm to 1 mm, optionally in a range 1 nm to 2500 nm, which includes ultraviolet, visible light and near-infra-red wavelengths.

In a further aspect, which may be provided independently, there is provided a method comprising: filtering by a dual-wavelength filter of an OWC device light arriving at a receiver, wherein the dual-wavelength filter is configured to pass light of a first frequency and light of a second, different frequency, and wherein the dual-wavelength filter is configured to substantially block light of a third frequency between the first frequency and second frequency; and receiving by a photodetector of the OWC device the filtered light; sensing by the photodetector modulated light of the first frequency and/or modulated light of the second frequency in the filtered light; producing by the photodetector at least one receiver signal; performing, by demodulation circuitry of the OWC device and a processing resource of the OWC device, a demodulation and processing with respect to the at least one receiver signal to obtain data encoded in the modulated light of the first frequency and/or data encoded in the modulated light of the second frequency.

The method may further comprise controlling by a controller of the OWC device a light source of a transmitter of the OWC device to output modulated light of the third frequency and/or controlling by the controller a further light source of a further transmitter of the OWC device to output modulated light of the second frequency, thereby to produce an output OWC signal in which data is encoded by modulation of light emitted by the light source and/or further light source.

The controller may be configured to select a first mode of operation or second mode of operation for the OWC device, wherein: the first mode of operation comprises receiving modulated light of the first frequency and/or second frequency and transmitting data by modulation of light of the third frequency emitted by the transmitter; and the second mode of operation comprises receiving modulated light of the second frequency and transmitting data by modulation of light of the second frequency emitted by the further transmitter.

Features in one aspect may be applied as features in any other aspect in any suitable combination. For example, device features may be applied as method features and vice versa.

BRIEF DESCRIPTION OF THE DRAWINGS

Various aspects of the invention will now be described by way of example only, and with reference to the accompanying drawings, of which:

FIG. 1 is a schematic diagram of an optical wireless communication system;

FIG. 2a is a schematic diagram of a wireless communication system in accordance with an embodiment;

FIG. 2b is a schematic illustration of an example of use of the wireless communication system of FIG. 2a;

FIG. 7b is a schematic illustration of an example of use of the wireless communication system of FIG. 7a;

DETAILED DESCRIPTION OF THE DRAWINGS

Figure 3:
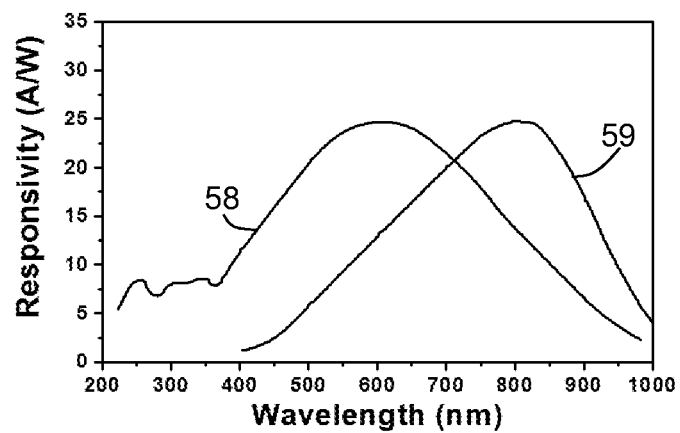
FIG. 3 is a plot showing examples of avalanche photodiode (APD) responsivities.

The term light as used herein may refer to electromagnetic waves with wavelengths in a range 1 nm to 1 mm. Light may include ultraviolet, visible, near-infrared and far-infrared electromagnetic radiation.

FIG. 1 is a schematic block diagram illustrating an optical wireless communication (OWC) system. A first OWC apparatus 10 is configured to send a wireless optical signal in which information is encoded. The first apparatus 10 is configured to send the wireless optical signal through a first optical communication channel 12 and through a second optical communication channel 14 to a second OWC apparatus 16. The optical communication channels 12, 14 may be free-space communication channels. Each of the optical communication channels has a characteristic optical wavelength. Each of the optical communication channels may also have a characteristic range of wavelengths. The characteristic optical wavelength of the second optical communication channel 14 is different to the characteristic optical wavelength of the first optical communication channel 12.

The second OWC apparatus 16 is configured to send a further wireless optical signal in which information is encoded. The second OWC apparatus 16 is configured to send the further wireless optical signal through a third optical communication channel 17 to the first OWC apparatus 10.

The first OWC apparatus may be an access point (AP) which comprises a transmitter and a receiver. An AP may provide access to a local network.

The second OWC apparatus 16 may be a station (STA) which comprises a transmitter and a receiver.

A station may be mobile or fixed. Without limitation, examples of stations include personal computers, laptops, desktops and smart devices.

The apparatuses 10, 16 may support a bi-directional communication protocol. The apparatuses 10, 16 may support any suitable communication protocol, for example IEEE 802.15.7, 802.15.13, 802.11 or extensions or developments thereof; ITU-T G.9960 or extensions or developments thereof; or ITU-T G.vlc or extensions or developments thereof.

Each of the optical communication channels 12, 14, 17 may comprise a respective LiFi communication channel. A LiFi communication channel may have various desirable characteristics. For example, it may have a range of up to 20 m or more, and a transmission cone in a range of 60 degrees to 90 degrees in some arrangements. It has high bandwidth in comparison with for example RF or IrDA (Infrared Data Association) protocols. Full duplex is possible by using two frequencies or frequency ranges allowing high throughput speeds, e.g. halving time or doubling bandwidth of communication. Reception bandwidth is independent of transmission bandwidth, and therefore there may potentially be twice the bandwidth available for the communication exchange. It may be difficult to fake due to complexity of protocol and data stream format. It is possible to spectrum hop, for example.

The first OWC apparatus 10 may each comprise or form part of a luminaire, which is part of an overhead lighting system. The second OWC apparatus 16 may form part of a user device, for example a mobile device or dongle. The optical communication channels 12, 14 may be downlink channels that are used to send information from the luminaire to the mobile device. The third optical communication channel 17 may be an uplink channel that is used to send information from the mobile device to the luminaire. In other embodiments the OWC apparatuses 10, 16 may each comprise or form part of any suitable device, for example any device configured to transmit and/or receive OWC data.

FIG. 2a is a schematic diagram of an OWC system in accordance with an embodiment. An example of use of the OWC system of FIG. 2a is shown in FIG. 2b. The OWC system comprises an access point (AP) 20 and a station (STA) 30 which are configured for full-duplex communication with each other.

The AP 20 comprises mixed signal circuitry 22, a first AP transmitter 24, a second AP transmitter 26 and an AP receiver 28.

The mixed signal circuitry 22 is configured to receive data from a network (not shown) to which the AP 20 is connected, and to output a modulation signal that comprises or is representative of the data. In other embodiments, the AP 20 is not networked. The data may be obtained from any suitable data source or data store.

The mixed signal circuitry 22 includes, amongst other components, baseband circuitry, a digital to analogue converter, an analogue to digital converter, an amplification chain, at least one analogue filter, at least one power supply and at least one driver (all not shown). In other embodiments, some of the components listed above may be omitted from the mixed signal circuitry 22 and/or further components not listed may be present. In the present embodiment, the mixed signal circuitry 22 is configured to send the same modulation signal to the first AP transmitter 24 and the second AP transmitter 26. In other embodiments, the mixed signal circuitry 22 is configured to send a first modulation signal to the first AP transmitter 24 and a second, different modulation signal to the second AP transmitter 26. The second modulation signal may comprise or represent different data from the first modulation signal.

The first AP transmitter 24 comprises a first light source (not shown), which is configured to emit modulated visible light having a characteristic wavelength of around 450 nm. Since the light produced by the first light source is part of the visible light spectrum (which includes wavelengths in the range of around 400 nm to around 700 nm), the first light source produces light that may also be used for illumination. The first AP transmitter 24 further comprises circuitry (not shown) which is configured to drive the first light source to emit light having an intensity that is modulated in accordance with the modulation signal.

The second AP transmitter 26 comprises a second light source (not shown), which is configured to emit modulated infrared light having a characteristic wavelength of around 860 nm. The second AP transmitter 26 further comprises circuitry (not shown) which is configured to drive the second light source to emit light having an intensity that is modulated in accordance with the modulation signal.

In the description below, references to wavelengths around 450 nm, around 800 nm, and around 860 nm may be taken to refer to wavelengths in the region of 450 nm, 800 nm and 860 nm respectively. For example, wavelengths around 450 nm may refer to wavelengths between 430 nm and 470 nm, optionally between 440 nm and 460 nm. Wavelengths around 800 nm may refer to wavelengths between 780 nm and 820 nm, optionally between 790 nm and 810 nm. Wavelengths around 860 nm may refer to wavelengths between 840 nm and 880 nm, optionally between 850 nm and 870 nm.

The first light source and second light source may each comprise any suitable light source, for example an LED, a laser, for example a VCSEL (vertical-cavity surface-emitting laser) or a laser diode, or an LEP (light-emitting plasma). The first light source and second light source may each comprise a plurality of light sources, for example an array of light sources. In other embodiments, light having any suitable wavelengths or ranges of wavelengths may be emitted by the first light source and second light source.

The AP receiver 28 comprises at least one photodetector (not shown) which is configured to detect modulated light having a characteristic wavelength of around 800 nm. Any suitable photodetector or photodetectors may be used. For example, the AP receiver 28 may comprise at least one Si PIN photodiode, silicon photomultiplier (SiPM), single photon avalanche diode (SPAD), Graphene-CMOS high-resolution sensor or avalanche photodiode (APD).

The AP receiver 28 further comprises a filter 29 which is positioned in front of the at least one photodetector. The filter 29 may be referred to as an AP Rx filter 29. The filter 29 is configured to allow light at the around 800 nm wavelength to pass into the at least one photodetector while blocking light at other frequencies. In particular, the filter 29 blocks light at the around 450 nm and around 860 nm frequencies which are used by the AP 20 for transmission.

The AP receiver 28 further comprises receiver circuitry that is configured to obtain a signal from the photodetector that is representative of the light received by the photodetector, and to process the signal from the photodetector to provide a receiver signal to the mixed signal circuitry 22.

The mixed signal circuitry 22 is further configured to receive the receiver signal from the AP receiver 28 and demodulate the receiver signal to obtain data. The mixed signal circuitry 22 is further configured to send the data to the network (not shown) to which the AP 20 is connected.

The STA 30 comprises mixed signal circuitry 32, a STA receiver 34, a first STA transmitter 36, and a second STA transmitter 38. The STA 30 comprises a controller (not shown) which is configured to switch the STA 30 between a first mode of operation for AP-STA communication and a second mode of communication for STA-STA communication. FIG. 2*a* shows use of the STA 30 in AP-STA communication, in which the first mode of operation is selected by the controller. The second mode of operation for STA-STA communication is described below with reference to FIG. 7*a*.

The mixed signal circuitry 32 comprises baseband circuitry, a digital to analogue converter, an analogue to digital converter, an amplification chain, at least one analogue filter, at least one power supply and at least one driver (all not shown). In other embodiments, some of the components listed above may be omitted from the mixed signal circuitry 32 and/or further components not listed may be present. The mixed signal circuitry 32 is configured to provide both full-duplex communication and half-duplex communication, as controlled by the controller.

The STA receiver 34 comprises a photodetector 37 (not shown in FIG. 2) that is sensitive to light in the visible spectrum and in the infrared spectrum. In the present embodiment, a size of the photodetector is 4 mm×2.5 mm. In other embodiments, any suitable size of photodetector may be used. Photodetectors that are sensitive to a broad spectrum of light are known. For example, a photodetector may be sensitive to ultraviolet, visible and infrared wavelengths. In the present embodiment, the STA receiver 34 comprises at least one APD (avalanche photodiode). FIG. 3 shows a plot of responsivity for a first example of an APD (line 58) and for a second example of an APD (line 59). Each of the APDs for which responsivity is shown in FIG. 3 has sufficient responsivity to receive signals in both visible and near IR wavelengths.

Figure 4:
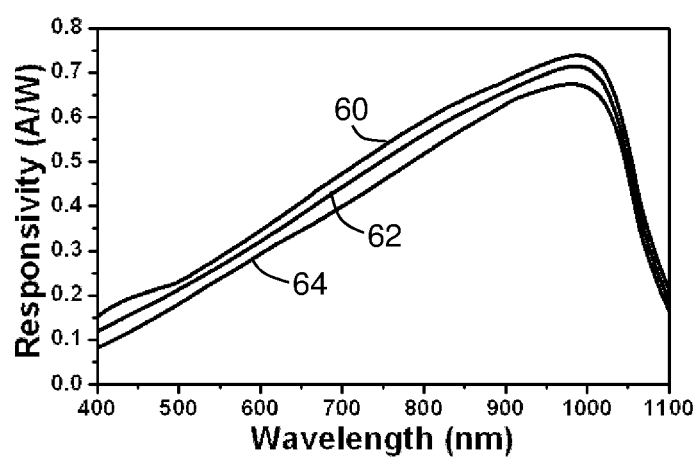
FIG. 4 is a plot showing an example of Si PIN photodiode responsivity.

In other embodiments, the STA receiver 34 comprises at least one Si PIN photodiode. FIG. 4 shows a plot of maximum responsivity 60, average responsivity 62, and minimum responsivity 64 for the Si PIN photodiode. The Si PIN photodiode has sufficient responsivity to receive signals in both visible and near IR wavelengths.

In further embodiments, the STA receiver 34 may comprise any photodetector that is capable of receiving visible and infrared light of suitable frequencies. For example, the STA receiver 34 may comprise at least one Graphene-CMOS high-resolution sensor. The Graphene-CMOS sensor may be sensitive to wavelengths between around 300 nm and around 2000 nm and may be used for optical data communication.

In further embodiments, the STA receiver 34 may comprise at least one silicon photomultiplier (SiPM) or single photon avalanche diode (SPAD) as the photodetector.

The STA receiver 34 further comprises a dual-wavelength filter 35, which may be referred to as a STA Rx filter 35. The dual-wavelength filter 35 may also be referred to as a dual-band filter, notch filter, band-stop filter or rejection filter.

The dual-wavelength filter 35 is positioned in front of the photodetector 37 to filter light being received by the STA receiver 34. The dual-wavelength filter 35 is configured to transmit light at around 450 nm and around 860 nm wavelengths while blocking light at other frequencies. In particular, the filter 35 blocks light at frequencies between around 450 nm and around 860 nm, including the around 800 nm wavelength that is used for uplink transmission from the STA 30 to the AP 20. The filter 35 allows through an amount of around 450 nm and around 860 nm light which is sufficient for OWC but has low transmission at around 800 nm.

Figure 5:
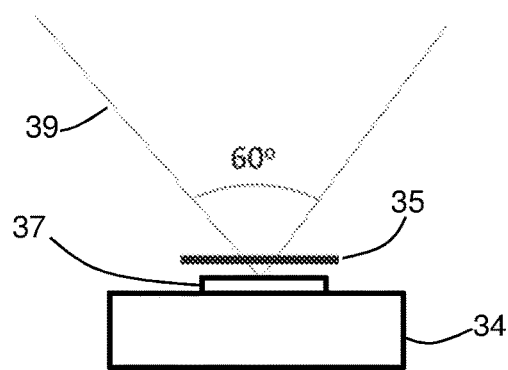
FIG. 5 is a schematic diagram of a thin film dual wavelength filter and STA receiver apparatus system.

In the present embodiment, the dual-wavelength filter 35 is a thin film filter. FIG. 5 shows the positioning of a thin film filter used as a dual-wavelength filter 35. The thin film filter 37 may comprise a coat glass wafer mounted onto the casing (not shown) of the STA receiver apparatus 34 package providing an air to glass interface at both surfaces. The field of view (FOV) 39 of the STA receiver apparatus 34 is 60°. The thin film filter 35 controls reflectivity by building up a series of layers of different refractive indices on a substrate.

Figure 6:
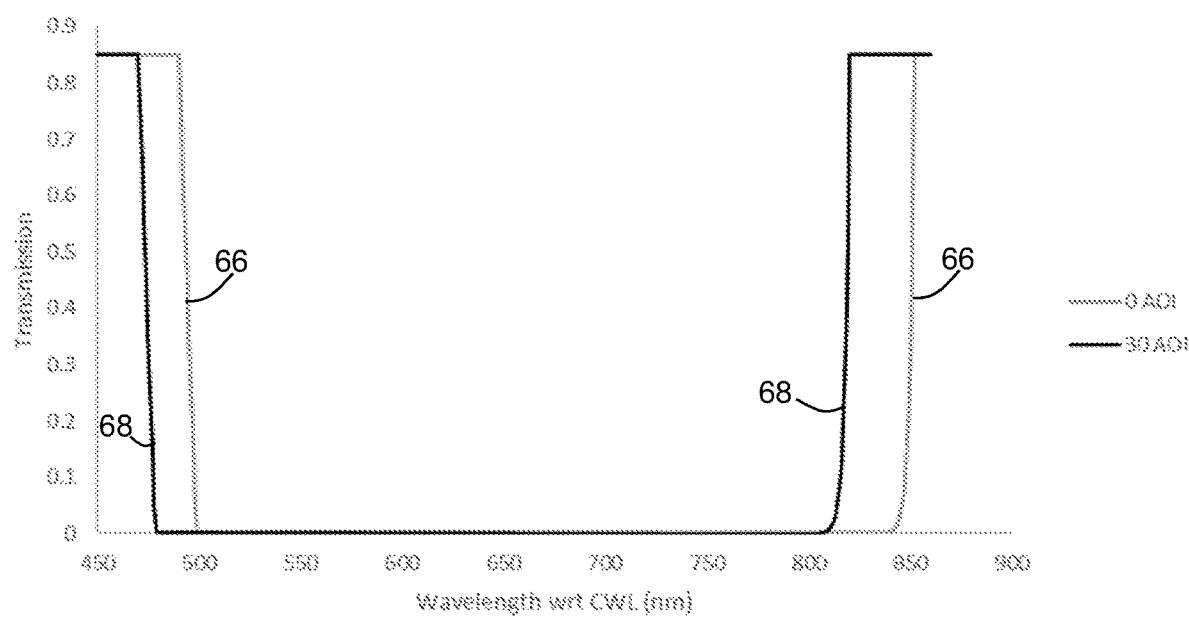
FIG. 6 is a plot showing an example of transmissivity of a thin film dual-wavelength filter based on angle of incidence of light.

By the nature of the process by which light is reflected, these filters are angle sensitive. In particular, the band edges (between high and low reflectivity) move with angle. At wavelengths of around 800 nm, the band edge can move by around 30 nm (or 3% to 4%) for an angular shift of 30°. At wavelengths of around 450 nm, the band edge can move by around 20 nm (or 3% to 4%) for the same angular shift. Therefore, a thin film filter which has a band edge at around 850 nm will shift to around 820 nm as the angle increases from on axis (0° angle of incidence) to off axis (30° angle of incidence). FIG. 6 shows such a shift. FIG. 6 is a plot of transmissivity versus wavelength, with line 66 representing the transmission profile of light at an angle of incidence of 0° and line 68 representing the transmission profile of light at an angle of incidence of 30°. In the present embodiment, as shown in FIG. 6, the thin film filter will always block light at 800 nm and will always pass light at 860 nm. The thin film filter minimizes the amount of background light from the visible part of the spectrum not used for OWC.

In other embodiments, any suitable dual-band filter may exist. Filter types may include material filters where the material has the right spectral characteristics of absorption and reflection. The filter may not be angle sensitive. Other types of filter may include plasmonic filters.

In further embodiments, different frequencies may be used. The dual-wavelength filter may be used to pass light at a first frequency used for transmission by the AP and to pass light at a second frequency also used for transmission by the AP. The dual-wavelength filter may be configured to block a range of frequencies between the first and second frequency which includes a third frequency. The third frequency may be a frequency that is used for transmission by the STA 30. The first frequency may be a frequency of visible light and the second frequency may be a frequency of infrared light.

The STA receiver 34 further comprises circuitry (not shown) which is configured to receive a signal from the photodetector that is representative of modulated light received by the photodetector and to output a receiver signal to the mixed signal circuitry 32.

The mixed signal circuitry 32 is further configured to receive the receiver signal from the STA receiver 34 and demodulate the receiver signal to obtain data. The mixed signal circuitry 32 includes, amongst other components, an analogue to digital converter (not shown). The data received by the STA 30 may be used in any suitable manner, for example to provide information or a service to a user of a device in which the STA 30 is incorporated.

The mixed signal circuitry 32 is further configured to obtain digital or analogue data for uplink transmission. For example, the mixed signal circuitry 32 may obtain data from an input by a user of a device in which the STA 30 is incorporated, or from processes running in the device in which the STA 30 is incorporated. The mixed signal circuitry 32 is configured to output a modulation signal that comprises or is representative of the data. The mixed signal circuitry 32 includes, amongst other components, a digital to analogue converter (not shown).

The first STA transmitter 36 and second STA transmitter 38 are both configured to transmit modulated infrared light, using different optical frequencies. The controller selects which of the first STA transmitter 36 and second STA transmitter 38 is used to transmit data. The modulation signal is sent to the selected transmitter.

Figure 7A:
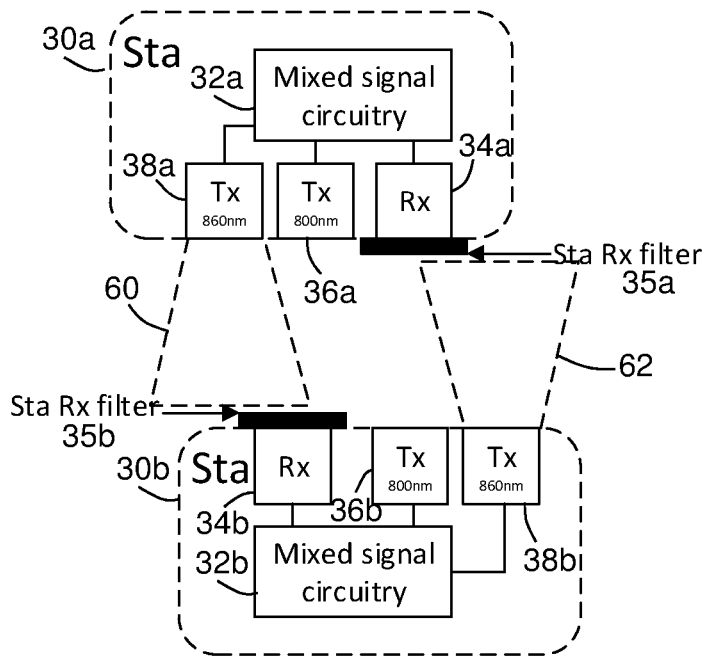
FIG. 7a is a schematic diagram of a wireless communication system in accordance with an embodiment.

In the scenario shown in FIG. 2a, the controller selects a first mode of operation in which the first STA transmitter 36 is used to transmit modulated infrared light of the third frequency. In scenarios in which the STA 30 is used for transmission to another STA rather than to an AP (for example, scenarios as shown in FIG. 7a), the controller selects a second mode of operation in which the second STA transmitter 38 is used to transmit modulated infrared light of the second frequency.

The first STA transmitter 36 comprises a light source which is configured to emit modulated infrared light having a wavelength of around 800 nm. In other embodiments, any suitable wavelength or range of wavelengths may be emitted by the first STA transmitter 36. This third frequency or range of frequencies can be any amongst the frequencies blocked by the dual wavelength filter 35. The first STA transmitter 36 further comprises circuitry (not shown) which is configured to receive a modulation signal and to drive the light source of the first STA transmitter 36 to emit light having an intensity that is modulated in accordance with the modulation signal.

The second STA transmitter 38 comprises a light source which is configured to transmit modulated infrared light having a wavelength of around 860 nm. In other embodiments, any suitable wavelength or range of wavelengths may be transmitted by the second STA transmitter 38. This wavelength or range of wavelengths are in the range of transmitted wavelengths of the filter 35. The second STA transmitter 38 further comprises circuitry (not shown) which is configured to receive a modulation signal and to drive the light source of the second STA transmitter 38 to emit light having an intensity that is modulated in accordance with the modulation signal.

The light source of the first STA transmitter 36 and the light source of the second STA transmitter 38 may each comprise any suitable light source, for example a laser, for example a VCSEL (vertical-cavity surface-emitting laser) or a laser diode, or an LEP (light-emitting plasma). The light source of the first STA transmitter 36 and the light source of the second STA transmitter 38 may each comprise a plurality of light sources, for example an array of light sources. In other embodiments, light having any suitable wavelengths or ranges of wavelengths may be emitted by the light source of the first STA transmitter 36 and the light source of the second STA transmitter 38.

With the STA 30 in the first mode of operation, downlink data is transmitted from the AP 20 to the STA 30 using the first AP transmitter 24 and/or the second AP transmitter 26. The first AP transmitter 24 emits light at around 450 nm into a first conical region 40. The second AP transmitter 26 emits light at around 860 nm into a second conical region 42. The first and second conical regions 40, 42 overlap.

In the present embodiment, the STA 30 in the first mode of operation is configured to receive and process modulated light at around 450 nm and to receive and process modulated light at around 860 nm. The STA 30 in the first mode of operation is therefore capable of receiving light that is sent from the AP 20 using only the first AP transmitter 24; only the second AP transmitter 24; or both the first and second AP transmitters 24, 26.

In some circumstances, the first and second AP transmitters 24, 26 are used to transmit the same data, for example to reduce noise levels. The second AP transmitter 26 may be used for data transmission when light levels output by the first AP transmitter 24 are low, for example due to dimming of a luminaire in which the first AP transmitter 24 is incorporated. The second AP transmitter 26 may be used when high speed data transmission is required. In other circumstances, the first AP transmitter 24 and second AP transmitter 26 may be used to transmit different data.

In other embodiments, the controller of the STA may be configured to select a mode of operation in which the STA 30 receives and processes only light at around 450 nm; a mode of operation in which the STA 30 receives and processes only light at around 860 nm; a mode of operation in which the STA 30 receives and processes light at around 450 nm and light at around 860 nm to obtain a common signal sent using both frequencies of light; and/or a mode of operation in which the STA 30 receives and processes light at around 450 nm and light at around 860 nm to obtain different signals sent using each of the frequencies of light.

The STA receiver 34 is positioned within the region of overlap between the first and second conical regions 40, 42. Modulated light from the first transmitter 24 (if used) and modulated light from the second transmitter 26 (if used) passes through the dual-wavelength filter 35 and is received by the STA receiver 34. At least one signal representative of the modulated light is demodulated to obtain the transmitted data.

Uplink data is transmitted from the STA 30 to the AP 20 using the first STA transmitter 36. For uplink communication, the first STA transmitter 36 emits modulated light at the around 800 nm frequency that can be received by the AP receiver 28. The modulated light is emitted into a third conical region 44. In the present embodiment, the third conical region overlaps with the second conical region 42. In other embodiments, the third conical region may additionally or alternatively overlap with the first conical region 40.

Modulated light from the first STA transmitter 36 passes through the AP Rx filter 29 and is received by the AP receiver 28. A signal representative of the received light is demodulated to obtain the transmitted uplink data.

FIG. 2b shows an example of use of the system of FIG. 2a. In the example of FIG. 2b, at least part of the AP 20 (not shown in FIG. 2b) is embedded in a luminaire 50, which illuminates region 52 of a room. The luminaire 50 illuminates the region 52 with visible light which includes light transmitted from the first AP transmitter 24 (not shown in FIG. 2b).

A user 54 operates a mobile device 56 within the illuminated region 52. In the example of FIG. 2b, the mobile device 56 is an e-reader or tablet device.

The STA 30 (not shown in FIG. 2b) is embedded within the mobile device 56. In other embodiments, the STA 30 may be external to the mobile device 56 and may be coupled to the mobile device 56 by any suitable method. For example, the STA 30 may form part of a dongle.

Downlink communication from the AP 20 in the luminaire 50 to the STA 30 in the mobile device 56 is provided using either or both of a visible light connection from the first AP transmitter 24 to the STA receiver 34 in the mobile device and an infrared connection from the second AP transmitter 26 to the STA receiver 34. Uplink communication from the STA 30 to the AP 20 is provided using an uplink infrared connection from the first STA transmitter 36 to the AP receiver 28. The uplink infrared connection has a different frequency to the infrared connection that is used for downlink.

The system of FIG. 2a provides full-duplex OWC/LiFi communication between the AP 20 and STA 30. The system of FIG. 2a allows multiwavelength (blue and infrared) AP to STA communication. The signal from two light sources (blue and infrared) may be multiplexed. The frequency response of blue or white LEDs may be combined with the frequency response of infrared LEDs or VCSELs while reducing the interference or noise from ambient light.

In the STA 30, a dual-wavelength filter 35 is used in conjunction with a single detector. By using a dual-wavelength filter with a single detector, a number of components may be kept to a minimum. A degree of complexity of the STA 30 may be limited.

One alternative approach to communication could be to use two different detector assemblies, one for each transmission wavelength of the AP, each having a respective photodetector plus a respective filter. Incorporating two detectors and two receivers may add complexity. Incorporating two detectors and two receivers may result in additional maintenance of the separate components for each wavelength. For each wavelength, the use of an additional detector may add to the cost of the units.

Figure 7B:
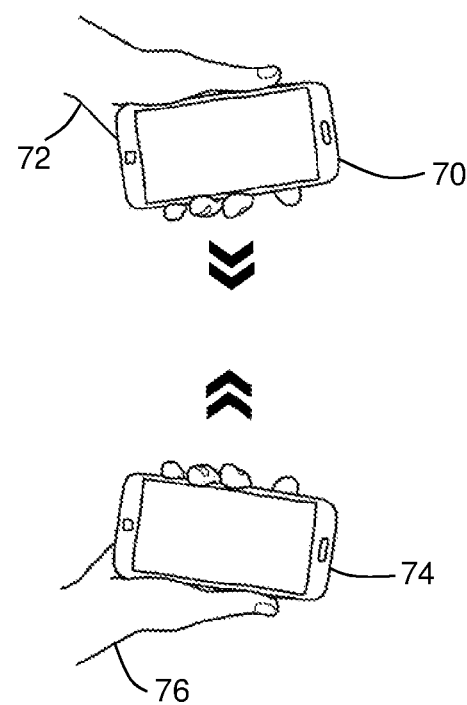

FIG. 7a is a schematic diagram of a wireless communication system in accordance with an embodiment. An example of use of the wireless communication system of FIG. 7a is shown in FIG. 7b. The wireless communication system comprises two station 30a, 30b. Each station 30a, 30b comprises respective mixed signal circuitry 32a, 32b; STA receiver 34a, 34b; dual-wavelength filter 35a, 35b; first STA transmitter 36a, 36b; and second STA transmitter 38a, 38b as described above with reference to the STA 30 of FIG. 2a.

A second mode of operation of each STA 30a, 30b is selected to provide device to device (D2D) operation using a half-duplex scheme.

In use, the controller of the first station 30a selects transmission by the second STA transmitter 38a of the first station 30a. The second STA transmitter 38a of the first station 30a transmits modulated infrared light at around 860 nm into a conical region 60. The light from the second STA transmitter 38a passes through the dual-wavelength filter 35b of the second station 30b, which is configured to transmit light of around 450 nm and around 860 nm wavelengths. The modulated light from the second STA transmitter 38a is received by the receiver 34b of the second station 30b and demodulated to obtain data.

The controller of the second station 30b selects transmission by the second transmitter 38b of the second station 30b at a time at which the first STA 30a is not transmitting.

The second STA transmitter 38b of the second station 30b transmits modulated infrared light at around 860 nm into a further conical region 62. The light from the second STA transmitter 38b passes through the dual-wavelength filter 35a of the first station 30a and is received by the receiver 34a of the first station 30a and demodulated to obtain data.

FIG. 7b is a schematic illustration of use of the system of FIG. 7a. The first station 30a (not shown in FIG. 7b) forms part of or is coupled to a first mobile device 70 used by a first user 72. The second station 30b (not shown in FIG. 7b) forms part of or is coupled to a second mobile device 74 used by a second user 76. Data may be sent from one mobile device to another using OWC/LiFi communication on the around 860 nm wavelength. For example, FIG. 7b represents device to device transmission of data from the second transmitter 38b (not shown in FIG. 7b) of the second device 74 to the receiver 34a (not shown in FIG. 7b) of the first device 70. Data may be transmitted by device to device transmission between any two stations having an architecture as shown in FIGS. 2b and 5b, as long as the stations are adequately close and a suitable optical communication path is available.

The access point and stations of FIG. 2a and FIG. 7a may provide a system capable of full-duplex OWC/LiFi between the AP and STA and half-duplex between STA and STA with limited hardware complexity. The system may be capable of working when the visible lights are switched off. The system may provide an increased data rate by parallel data transmission across visible and infrared links. The system may perform traditional LiFi and device-to-device communication with minimal complexity.

A first AP to STA connection runs over visible light, which if used as the only connection would mean that the LiFi connection will stop when the lights are turned off. A second AP to STA connection is used as an additional link in the IR where the eye is not sensitive, providing a light-off or low-light mode. Two separate wavelengths may be received at the receiver.

In some embodiments, a high speed IR link is used in parallel with the visible link over the lights. Two separate sources in the AP are used which are both detected at the STA. Using a high speed IR link may overcome limitations in data rates through lighting, for example limitations due to the electrical modulation bandwidth of LEDs.

A system is described that allows AP to station/device communication as well as station to station/D2D communication. The system uses only one detector to receive data at multiple wavelengths while maintaining good rejection of ambient or out-of-band light.

A D2D link may be provided between separate stations as well as an AP-STA link. The station uses two separate sources: one to communicate with the AP and one between stations.

Good SNR is maintained to maximise the data rate. As much ambient or background light is rejected as possible by using the dual-wavelength filter. As much uplink signal as possible is also rejected to avoid self-interference in full-duplex mode.

In other embodiments, a system may comprise any suitable number of devices, for example any suitable number of APs and STAs. A STA may switch between D2D transmission with one or more STAs, and AP-STA communication with one or more APs. An AP may communicate with any one or more of the STAs.

In embodiments described above, a controller switches a STA into either a first mode of operation for AP-STA communication or a second mode of operation for STA-STA communication. In the first mode of operation, the first STA transmitter 36, 36a, 36b transmits at around 800 nm for communication with an AP. In the second mode of operation, the second STA transmitter 38, 38a, 38b transmits at around 860 nm for communication with a STA. In further embodiments, the controller may switch the STA into a mode in which both the first STA transmitter 36, 36a, 36b and the second STA transmitter 38, 38a, 38b are operational, for example to provide simultaneous or near-simultaneous communication with an AP and with another STA. In some embodiments, multiplexing is applied in software to allow the first STA transmitter 36, 36a, 36b to transmit to an AP at substantially the same time as the second STA transmitter 38, 38a, 38b is transmitting to another STA.

In order for similar devices to communicate directly by device-to-device communication via LiFi/optical wireless communication (OWC)/visible light communication (VLC), devices are used that are capable of receiving an optical signal transmitted by another similar device.

An example of an OWC communication protocol capable of D2D communication is IrDA. However, IrDA operates in half-duplex mode due to transmission and reception being performed on the same wavelength. IrDA full-duplex communication is not practical due to interference. Therefore, IrDA operates in half-duplex. Embodiments described above allow for both full-duplex AP-STA communication and half-duplex STA-STA communication to be provided by the same device with limited complexity.

Furthermore, embodiments described above may allow for a larger angular field of view than is typically provided by IrDA. IrDA may be limited to an angle of around 15°.

In embodiments described above, the same baseband circuitry may be used for AP-STA communication as is used for STA-STA communication. A station may comprise a single set of baseband circuitry that is used to communication both with APs and with other stations.

In the embodiments described above with reference to FIGS. 2a and 7a, an optical filter 35, 35a, 35b is used which has high transmission over two wavelength bands in front of the detector. High ambient or background light rejection may be maintained but with the option to run the system using blue wavelengths of visible light and also infrared.

Figure 8:
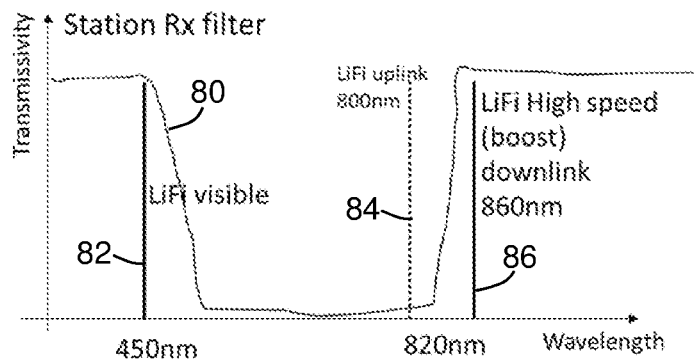
FIG. 8 is a plot showing a transmission profile of a proposed station receive (STA Rx) filter and illustrating its operation in AP-STA communication.

A transmission profile of a proposed STA Rx optical filter 35, 35a, 35b is shown in FIG. 8. FIG. 8 is a plot of transmissivity versus wavelength, with line 80 representing the transmission profile of the STA Rx filter 35, 35a, 35b. It can be seen in FIG. 8 that the filter transmits a large proportion of light up to around 450 nm. Its transmissivity then decreases to block a large proportion of light in a region between around 500 nm and around 820 nm. At around 820 nm, transmissivity increases again such that a large proportion of light at around 860 nm and above is transmitted by the filter 35.

FIG. 8 also illustrates the wavelengths used for operation of the system of FIG. 2a. The STA Rx filter 35 transmits light 82 that is transmitted at the visible LiFi downlink wavelength of around 450 nm. The STA Rx filter 35 transmits light 86 that is transmitted at the infrared downlink frequency around 860 nm. The STA Rx filter 35 substantially blocks light 84 that is transmitted at the LiFi uplink frequency around 800 nm.

In other examples, any suitable wavelengths may be transmitted and blocked by the STA Rx filter 35, such that the two downlink frequencies on which the AP transmits to the STA are passed by the filter, and the uplink frequency on which the STA transmits to the AP is blocked.

Figure 9:
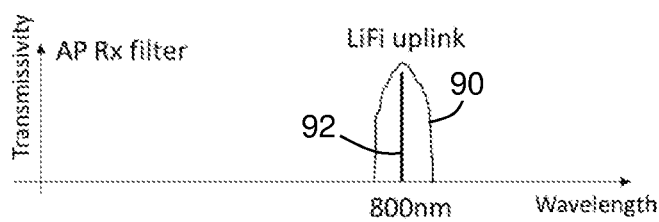
FIG. 9 is a plot showing a transmission profile of a proposed access point receive (AP Rx) filter and illustrating its operation in STA-AP communication.

A transmission profile of a proposed AP Rx optical filter 29 is shown in FIG. 9. FIG. 9 is a plot of transmissivity versus wavelength, with line 90 representing the transmission profile of the AP Rx filter 29. The AP Rx filter 28 transmits within a relatively narrow band from approximately around 780 nm to around 820 nm, which includes the around 800 nm LiFi uplink frequency. A large proportion of light 92 that is transmitted at the around 800 nm frequency is passed by the AP Rx filter 29. Outside the around 780 nm to around 820 nm region, a large proportion of light is blocked by the AP Rx filter 29.

Figure 10:
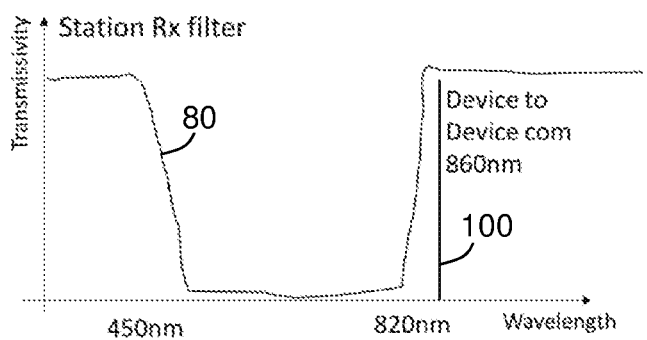
FIG. 10 is a plot illustrating operation of the proposed STA Rx filter of FIG. 8 in STA-STA communication.

FIG. 10 shows the same STA Rx filter transmission profile 80 as FIG. 8. FIG. 10 illustrates the use case of FIGS. 7a and 5b, in which there is device to device communication between stations. Light 100 at the around 860 nm wavelength is transmitted from one station to another. A large portion of the light 100 at the around 860 nm wavelength passes through the STA Rx filter, providing device to device communication.

The STA Rx filter 35 acts as a low pass filter at around 500 nm. This allows light in the blue to pass through the filter. In many embodiments in which data is carried using light transmitted from standard lighting systems, the blue part of the spectrum contains the data as the bandwidth available for data may be higher at blue wavelengths than in other parts of visible spectrum.

The STA Rx filter 35 has low transmission in the green and red part of the spectrum (around 500 nm to around 700 nm). Most of the ambient light from standard lighting and a significant part of the solar spectrum is within the green and red part of the spectrum. Due to the slow response of current LEDs phosphors used in white LEDs, it may be the case that in some systems that green and red part of the spectrum carry no data and only contribute to noise. Therefore, the green and red part of the spectrum may be filtered out to maintain a good signal to noise ratio. Light from LEDs in standard lighting situations may include very little residual light at wavelengths above around 700 nm. The low transmission region of the STA Rx filter 35 may cut out a large proportion of the ambient light and light from the luminaire LED that does not carry an OWC signal, which in some cases may comprise most of the ambient light from the LED. Noise from the LED may therefore be substantially reduced.

The STA Rx filter 35 exhibits low transmission at the uplink wavelength of around 800 nm. The main link between the station and the AP can run in full duplex mode. Since the uplink wavelength of around 800 nm is filtered out, backscattered light from the uplink may not add noise to the signal, or may add only a minimal amount of noise.

The STA Rx filter 35 acts as a long pass filter at around 860 nm. Light at around 860 nm is allowed through the filter.

The light source at around 860 nm may serve multiple purposes. The around 860 nm light source may be used as an additional high speed source in the AP for high speed downlink data transfer. The around 860 nm light may be used as an additional source in the station for device to device communication.

Figure 11:
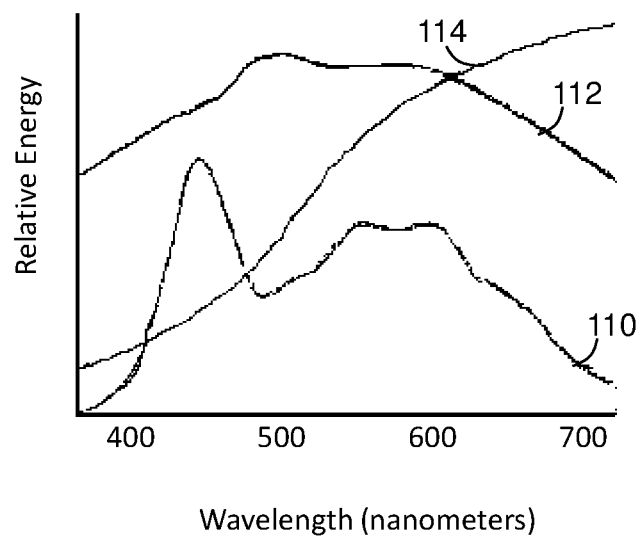
FIG. 11 is a plot showing typical visible light source spectra.

FIG. 11 is a plot showing some common light sources and the spectrum of light that each of the light sources generates. Line 110 is representative of the spectrum of a typical white LED. The typical white LED has a peak in the blue part of the spectrum below around 500 nm which may be used for data transmission. The typical white LED has a secondary broad peak through the green and red part of the spectrum which is rejected by the STA Rx filter 35.

Another significant source of noise in a LiFi system may be sunlight which is shown by line 112 and which peaks between around 500 nm and around 600 nm. The STA Rx filter 35 rejects light between around 500 nm and around 600 nm and may therefore reject a significant amount of ambient light, such as sunlight, which may cause noise on the detector. The ambient light may include, for example, light from a monitor or other screen or from other luminaires.

Figure 12:
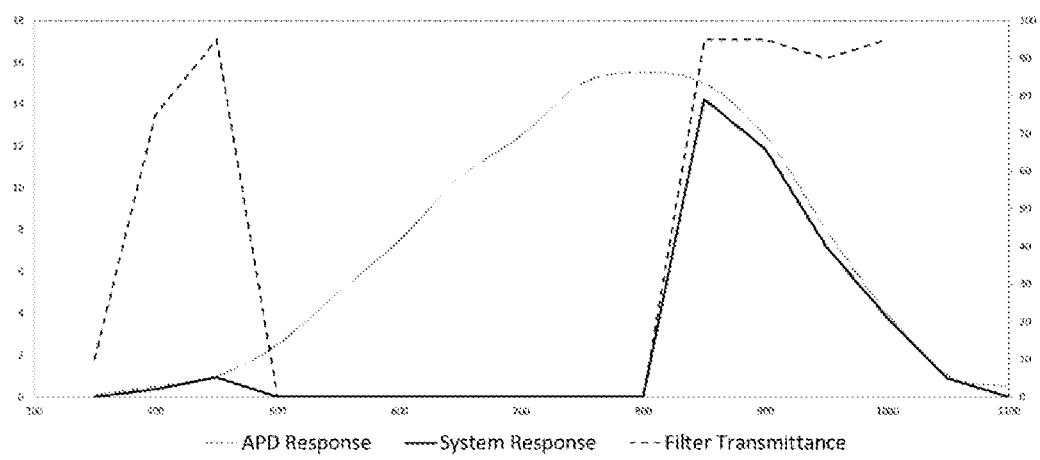
FIG. 12 is a plot showing a predicted responsivity spectrum of a system from visible wavelengths around 450 nm to infrared wavelengths up to around 1100 nm.

FIG. 12 shows a predicted responsivity of the system of FIG. 2a at both the visible wavelengths around 450 nm and IR wavelengths around 860 nm.

It can be understood that the filter used in various embodiments allows sufficient light to pass at the first and second frequencies so that photodetector signals arising from light at the first frequency and the second frequency have a signal to noise ratio suitable use in OWC communication.

Embodiments above describe the use of a dual-wavelength filter and two transmitters in a station. In other embodiments, a dual-wavelength filter configured to pass light of a first and second frequency and two transmitters respectively configured to transmit using the second frequency and a third frequency may be implemented in any suitable device which may or may not be a station. The device may be capable of communication with devices of the same type using the second frequency, and with apparatuses of a different type using the third frequency. The apparatuses of a different type with which the device communicates may each comprise at least two transmitters configured to transmit using the first frequency and second frequency, and a receiver configured to receive light of the third frequency. The apparatuses may or may not be access points.

A skilled person will appreciate that variations of the described embodiments are possible without departing from the invention. Accordingly, the above description of specific embodiments is provided by way of example only and not for the purposes of limitation. It will be clear to the skilled person that modifications may be made to the embodiments without departing from the scope of the invention.

The invention claimed is:

1. An optical wireless communication (OWC) device comprising:
  a receiver comprising:
    a dual-wavelength filter configured to filter light arriving at the receiver, wherein the dual-wavelength filter is configured to pass light of a first frequency and light of a second, different frequency, and wherein the dual-wavelength filter is configured to substantially block light of a third frequency between the first frequency and second frequency; and
    a photodetector configured to receive the filtered light and to sense modulated light of the first frequency and/or modulated light of the second frequency to produce at least one receiver signal;
  demodulation circuitry and a processing resource for performing a demodulation and processing with respect to the at least one receiver signal to obtain data encoded in the modulated light of the first frequency and/or data encoded in the modulated light of the second frequency;
  a transmitter comprising a light source configured to output modulated light of the third frequency;
  a further transmitter comprising a further light source configured to output modulated light of the second frequency; and
  a controller configured to control operation of the transmitter and/or further transmitter to produce an output OWC signal in which data is encoded by modulation of light emitted by the light source and/or further light source.

2. The OWC device according to claim 1, wherein the controller is further configured to select a first mode of operation or second mode of operation for the OWC device, wherein:
  the first mode of operation comprises receiving modulated light of the first frequency and/or second frequency and transmitting data by modulation of light of the third frequency emitted by the transmitter; and
  the second mode of operation comprises receiving modulated light of the second frequency and transmitting data by modulation of light of the second frequency emitted by the further transmitter.

3. The OWC device according to claim 2, wherein the first mode of operation comprises full-duplex communication with an optical wireless communication apparatus, and the second mode of operation comprises half-duplex optical wireless communication with at least one further OWC device.

4. The OWC device according to claim 2, wherein the OWC device comprises or forms part of a station.

5. The OWC device according to claim 4, wherein the first mode of operation comprises communication with an access point; and the second mode of operation comprises communication with one or more further stations.

6. The OWC device according to claim 1, wherein at least one of a), b), c) or d):
  a) the OWC device comprises or forms part of a mobile device;
  b) the light of the first frequency comprises visible light, the light of the second frequency comprises infrared light, and the light of the third frequency comprises infrared light;
  c) the light of the first frequency has a wavelength of around 450 nm; the light of the second frequency has a wavelength of around 860 nm; and the light of the third frequency has a wavelength of around 800 nm; or
  d) the dual-wavelength filter is configured to substantially block light from around 500 nm to around 700 nm.

7. The OWC device according to claim 1, wherein the dual-wavelength filter comprises a thin film filter.

8. The OWC device according to claim 7, wherein at least one of:
  the thin film filter comprises a coated glass wafer mounted onto a casing; or the thin film filter comprises a series of layers of different refractive indices on a substrate.

9. The OWC device according to claim 1, wherein a band edge of the dual-wavelength filter differs for different angles of incidence.

10. The OWC device according to claim 1, wherein the dual-wavelength filter comprises a plasmonic filter.

11. The system comprising a first OWC device in accordance with claim 1 and a second OWC device in accordance with claim 1, wherein the controller of the first OWC device and the OWC controller of the second device are each configured to select a second mode of operation for half-duplex communication between the first device and the second device, the half-duplex communication comprising transmission of modulated light of the second frequency by the respective further transmitters, and receiving of modulated light of the second frequency using the respective receivers.

12. The system according to claim 11, wherein:
each of the first OWC device and second OWC device comprises or forms part of a respective station; or each of the first device and second device comprises or forms part of a respective mobile device.

13. The system comprising an OWC device in accordance with claim 1 and an optical wireless communication apparatus comprising transmitters configured to transmit modulated light of the first and second frequencies, and a receiver configured to receive modulated light of the third frequency,
wherein the controller of the OWC device is configured to select a first mode of operation for full-duplex communication between the OWC device and the OWC apparatus, the full-duplex communication comprising uplink transmission of modulated light of the third frequency by the transmitter of the OWC device to the receiver of the OWC device, and downlink transmission of modulated light of the first and/or second frequency from at least one transmitter of the OWC apparatus to the receiver of the OWC device.

14. The system according to claim 13, wherein the OWC device comprises or forms part of a station, and the OWC apparatus comprises or forms part of an access point.

15. The system according to claim 13, wherein the OWC apparatus comprises or forms part of a luminaire, and a transmitter of the OWC apparatus is configured to emit light of the first frequency to provide illumination.

16. The system according to claim 13, wherein the OWC device comprises or forms part of a mobile device.

17. The system according to claim 13, wherein the downlink transmission of modulated light from the transmitters of the OWC apparatus comprises sending a first modulation signal using the first frequency and sending a second, different modulation signal using the second frequency.

18. The system according to claim 13, wherein the OWC apparatus is configured to use the first frequency for lower-speed data transmission and to use the second frequency for higher-speed data transmission.

19. The system according to claim 13, wherein the OWC device is configured to combine a signal received on the first frequency and a signal received on the second frequency.

20. The system comprising a first OWC device in accordance with claim 1, a second OWC device in accordance with claim 1, and an OWC apparatus;
wherein a controller of the first OWC device is further configured to select a first mode of operation or second mode of operation for the first OWC device, wherein:
the first mode of operation comprises receiving modulated light of the first frequency and/or second frequency from the OWC apparatus and transmitting data to the OWC apparatus by modulation of light of the third frequency emitted by the transmitter; and
the second mode of operation comprises receiving modulated light of the second frequency from the second OWC device and transmitting data to the second OWC device by modulation of light of the second frequency emitted by the further transmitter.

21. A method comprising:
filtering by a dual-wavelength filter of an OWC device light arriving at a receiver, wherein the dual-wavelength filter is configured to pass light of a first frequency and light of a second, different frequency, and wherein the dual-wavelength filter is configured to substantially block light of a third frequency between the first frequency and second frequency; and
receiving by a photodetector of the OWC device the filtered light;
sensing by the photodetector modulated light of the first frequency and/or modulated light of the second frequency in the filtered light;
producing by the photodetector at least one receiver signal;
performing, by demodulation circuitry of the OWC device and a processing resource of the OWC device, a demodulation and processing with respect to the at least one receiver signal to obtain data encoded in the modulated light of the first frequency and/or data encoded in the modulated light of the second frequency.

22. The method according to claim 21, the method further comprising:
controlling by a controller of the OWC device a light source of a transmitter of the OWC device to output modulated light of the third frequency and/or controlling by the controller a further light source of a further transmitter of the OWC device to output modulated light of the second frequency, thereby to produce an output OWC signal in which data is encoded by modulation of light emitted by the light source and/or further light source wherein the controller is configured to select a first mode of operation or second mode of operation for the OWC device, wherein:
the first mode of operation comprises receiving modulated light of the first frequency and/or second frequency and transmitting data by modulation of light of the third frequency emitted by the transmitter; and
the second mode of operation comprises receiving modulated light of the second frequency and transmitting data by modulation of light of the second frequency emitted by the further transmitter.

* * * * *